Patented Nov. 8, 1938

2,136,334

UNITED STATES PATENT OFFICE 2,136,334

METHOD OF AND COMPOUNDS FOR CONTROLLING POLYMERIZATION OF VINYLIDENE CHLORIDE

Gerald H. Coleman and John W. Zemba, Midland, Mich., assignors to The Dow Chemical Company, Midland, Mich., a corporation of Michigan No Drawing. Application October 23, 1937, Serial No. 170,646

4 Claims. (Cl. 23—250)

This invention relates to a method of and compounds for controlling or inhibiting the polymerization of vinylidene chloride.

When vinylidene chloride is exposed to the action of air and light a gradual polymerization takes place with the formation of resinous products. Such polymeric compounds are desirable plastics but it is necessary that a method be provided whereby the monomeric vinylidene chloride may be inhibited against polymerization at least temporarily so that it can be stored following its preparation and prior to its use in resin formation.

It is therefore among the objects of this invention to provide a process for and compounds capable of inhibiting the polymerization of vinylidene chloride. A further object of the invention is to provide a monomeric vinylidene chloride composition which will not polymerize per se. A still further object is to provide an inhibited vinylidene chloride composition from which the inhibitor can readily be removed when desired.

We have discovered that certain organic sulphur-containing compounds control the polymerization rate of vinylidene chloride, either inhibiting polymerization completely, or setting up a slow polymerization of a type intermediate between the rates hitherto obtainable, and furthermore, that such of these compounds as are inhibitors of the rate of polymerization can be conveniently separated from the vinylidene chloride immediately prior to the polymerization thereof. The organic sulphur-containing compounds which we prefer to employ are those in which the sulphur is in the position ordinarily occupied by oxygen in organic ethers, peroxides, ketones, alcohols, and the like, such as thio-ethers, mercaptans, thio-phenols, sulphides, and thioureas; compounds wherein sulphur is in the position ordinarily occupied by oxygen of the hydroxyl radical in the carboxyl group, examples of which are aliphatic and aromatic thiocarboxylic acids; and those heterocyclic compounds containing sulphur in a 5-membered ring. The heterocyclic 5-membered sulphur-containing rings which are effective for our purpose include many sulphur-nitrogen compounds.

The proportion in which such inhibitors are incorporated with the vinylidene chloride is dependent upon the length of time for which it is desired to influence the rate of polymerization and upon the particular agent employed. While any desired proportions of inhibitor may be so employed, the use of up to 10 per cent by weight thereof in the vinylidene chloride composition is generally sufficient. The low solubility in vinylidene chloride of many of the inhibitors hereinafter enumerated limits the proportions thereof which can effectively be employed to below about 1 per cent by weight of the composition.

In determining the effect of various compounds as inhibitors, the material to be tested was added to 10 milliliters, i. e. 12.5 grams, of vinylidene chloride in each of two 25-milliliter test tubes. The test tubes holding such composition were thereafter tightly stoppered. One tube of each set was exposed to light at a temperature of 25° to 35° C. for the duration of the test, while the other was placed in the dark at approximately the same temperature and for the same length of time. Each sample was examined to determine the amount of polymerized product therein as indicated by the amount of precipitated polymer accumulated in the bottom of the test tube. Controls were run on the same size samples of vinylidene chloride to which no inhibitor was added, the same conditions of temperature and light being employed.

The following examples illustrate the practice of our invention:

Example 1

When thio-carbanilide was added to monomeric vinylidene chloride in an amount equal to about 1 per cent of the weight thereof, both the sample which was exposed to sunlight and the sample placed in the dark were entirely free from any evidence of polymerization at the end of a week. A blank, to which no addition was made, was a semi-solid gel at the end of this period.

Example 2

When 1 per cent of thio-indigo was substituted for the thio-carbanilide of the preceding example, both samples were found to be entirely free from evidence of polymerization at the end of a week.

Example 3

When thio-salicylic acid was employed in an analogous maner in 1 per cent concentration, no polymerization occurred either in the dark or in the light over a period of a week.

Example 4

Thio-urea, when substituted for the inhibitors employed in the preceding examples, prevented polymerization of vinylidene chloride either in the dark or in the light.

Example 5

Captax (benzothiazole thiol) acted in an analogous manner and prevented polymerization of vinylidene chloride over extended periods of time both in the dark and in the light.

Example 6

Diphenyl sulphide, when added to monomeric vinylidene chloride, in amount equal to 7.5 per cent of the weight of said monomer, inhibited polymerization thereof, only slight traces of polymer being formed after long standing.

Each of the sulphur- or sulphur-and-nitrogen-containing compounds employed in the preceding examples controls the rate of polymerization of vinylidene chloride. The problem of storing a readily polymerizable substance between the time of its manufacture and the time when it is desired to effect polymerization thereof is important.

We have found that the monomeric vinylidene chloride which has been stored over an organic sulphur-containing compound capable of inhibiting its polymerization can be separated from such sulphur compound by fractional distillation of the vinylidene chloride. In each case the sulphur compounds employed remain as a distillation residue and are adapted to be re-employed for the inhibition of further quantities of vinylidene chloride. The vinylidene chloride distilled away from such polymerization inhibitors is found to polymerize readily under the usual conditions.

This application is a continuation-in-part of our co-pending application Serial No. 113,742, filed December 1, 1936.

Other modes of applying the principle of our invention may be employed instead of those explained, change being made as regards the materials employed, provided the step or steps or the products recited in the following claims be thereby carried out or obtained.

We therefore particularly point out and distinctly claim as our invention:

1. The process which comprises adding to monomeric vinylidene chloride up to 10 per cent of an organic sulphur-containing compound selected from the group consisting of thiocarbanilide, thioindigo, thiosalicylic acid, thiourea, benzothiazole thiol, and diphenyl sulphide, to inhibit the polymerization of vinylidene chloride.

2. A composition of matter comprising monomeric vinylidene chloride and sufficient of a compound selected from the group consisting of thiocarbanilide, thioindigo, thiosalicylic acid, thiourea, benzothiazole thiol, and diphenyl sulphide, to prevent the polymerization of the vinylidene chloride.

3. A composition of matter comprising monomeric vinylidene chloride and sufficient thiocarbanilide to prevent polymerization.

4. A composition of matter comprising monomeric vinylidene chloride and sufficient thio-urea to prevent polymerization.

GERALD H. COLEMAN.
JOHN W. ZEMBA.